United States Patent
Müller-Späth et al.

(10) Patent No.: US 8,440,086 B2
(45) Date of Patent: May 14, 2013

(54) MULTIFRACTION PURIFICATION PROCESSES AND DEVICES FOR SUCH PROCESSES

(75) Inventors: Thomas Müller-Späth, Zurich (CH); Lars Aumann, Zurich (CH)

(73) Assignee: ChromaCon AG, Zurich (CH)

( * ) Notice: Subject to any disclaimer, the term of this patent is extended or adjusted under 35 U.S.C. 154(b) by 28 days.

(21) Appl. No.: 13/141,937

(22) PCT Filed: Dec. 16, 2009

(86) PCT No.: PCT/EP2009/067277
§ 371 (c)(1),
(2), (4) Date: Jun. 23, 2011

(87) PCT Pub. No.: WO2010/079060
PCT Pub. Date: Jul. 15, 2010

(65) Prior Publication Data
US 2011/0253631 A1  Oct. 20, 2011

(30) Foreign Application Priority Data
Jan. 6, 2009 (EP) .................................. 09150106

(51) Int. Cl.
*B01D 15/08* (2006.01)
(52) U.S. Cl.
USPC .................... 210/659; 210/656; 210/198.2
(58) Field of Classification Search ............... 210/635, 210/656, 659, 198.2; 127/46.2
See application file for complete search history.

(56) References Cited

U.S. PATENT DOCUMENTS

| | | | | |
|---|---|---|---|---|
| 5,093,004 A * | 3/1992 | Hotier et al. | ................... | 210/659 |
| 5,114,590 A * | 5/1992 | Hotier et al. | ................... | 210/659 |
| 5,405,534 A * | 4/1995 | Ishida et al. | ................... | 210/662 |
| 7,141,172 B2 * | 11/2006 | Wang et al. | ................... | 210/659 |
| 7,837,881 B2 * | 11/2010 | Aumann et al. | ............... | 210/656 |
| 2006/0273013 A1 * | 12/2006 | Chin et al. | ................... | 210/656 |
| 2009/0050567 A1 * | 2/2009 | Aumann et al. | ............... | 210/657 |
| 2011/0253631 A1 * | 10/2011 | Muller-Spath et al. | ........ | 210/659 |

* cited by examiner

*Primary Examiner* — Ernest G Therkorn
(74) *Attorney, Agent, or Firm* — Sughrue Mion, PLLC

(57) ABSTRACT

A process for continuous or quasi-continuous purification of a multi-component mixture by means of at least four individual chromatographic columns through which the mixture is fed by means of at least one solvent, is given, wherein the multi-component mixture is to be separated into an integer number n of fractions, wherein n is at least 5.

14 Claims, 9 Drawing Sheets

MULTIFRACTION PURIFICATION PROCESSES AND DEVICES FOR SUCH PROCESSES

CROSS REFERENCE TO RELATED APPLICATIONS

This application is a National Stage of International Application No. PCT/EP2009/067277, filed on Dec. 16, 2009, which claims priority from European Patent Application No. 09150106.4, filed on Jan. 6, 2009, the contents of all of which are incorporated herein by reference in their entirety.

TECHNICAL FIELD

The invention relates to the field of multicolumn purification processes and their optimizations.

PRIOR ART

Batch chromatography is well known and routinely and preparatively applied in industrial productions. The technique is however rather costly in particular for large scale separation and purification due to high solvent consumption and expensive column material, and it requires an optimal use of the chromatographic equipment to be profitable.

For large scale separations in actual productions, continuous processes are much more economic than batch processes. Advantages of a continuous process are for example the simultaneous achievement of high yield and high purity, less solvent consumption, less costly fractionation and analyses, better flexibility for the quantities to be purified etc.

One way to realize a continuous chromatographic process is the so called Simulated Moving Bed Process (SMB, for a review see e.g. Markus Juza, Marco Mazzotti and Massimo Morbidelli, Simulated moving-bed chromatography and its application to chirotechnology, Trends in biotechnology, Elsevier B. V., TIBTECH, March 2000, Vol. 18, p 108-118). This process can separate a mixture into two fractions by adjusting two inlet streams (feed, eluent) and two outlet streams (raffinate, extract). The SMB process is countercurrent so that a well-defined separation of the two fractions is possible at high yields. Typical examples for the SMB technology in the industry are chiral separations, where two enantiomers are separated from a racemic mixture. If the selectivities are very small, a batch process results in low performance in terms of recovery (yield) and productivity while however SMB allows to have high performance.

Various modifications of the SMB process have been proposed in order to optimize and tailor it to specific separation problems. For example, it has been proposed to vary the instants of individual connection and disconnection of the inlet streams and the outlet streams, i.e. inlet streams and outlet streams are not switched synchronously as in classical SMB, but according to a specific and staged scheme (so-called Varicol-technique, see for example WO-A-2004/039468).

Another variation has been proposed by Morbidelli et al (see for example "PowerFeed operation of simulated moving bed units: changing flow-rates during the switching interval" by Ziyang Zhang, Marco Mazzotti, Massimo Morbidelli, Journal of Chromatography A, 1006 (2003) 87-99, Elsevier B.V.), in that in order to compensate the time-variation in the concentration of the output of the extract and raffinate due to the discrete switching after each cycle time the flow rate of the eluent is varied in a compensating manner coordinated to the switching interval, allowing to have even higher purity (so-called Powerfeed-technique).

A third and quasi-analogous variation has been proposed in which not the flow rate of the eluent but the concentration of the feed is varied in a compensating manner to achieve the same goal (so-called Modicon technique, see for example WO 2004/014511).

As already mentioned, in particular large scale chromatography is a laborious and expensive technique. It is mostly useful for the large scale separation of valuable molecules. The most valuable pharmaceutical molecules on the market are biomolecules like for example peptides, proteins and antibodies. These molecules are usually purified via solvent gradient batch chromatography. In contrast to the term "separation", which in the context of this application shall stand for the separation of a mixture of components into two fractions, "purification" in the context of this application stands for the separation of a mixture of at least m components into in fractions (with m equal to or larger than three) and that the desired product is intermediately adsorbing between one or more weakly and strongly adsorbing impurities, so that at least three fractions are generated with only the product component(s) being obtained in pure form.

One SMB cycle can only split the feed stream into two fractions, but for purifications, three fractions are required with the desired component in the intermediate fraction. Two staged or sequential SMBs would be required to purify a multicomponent mixture with an intermediate desired biomolecule and strongly adsorbing and weakly adsorbing impurities however with the problem that if e.g. in a first stage SMB a first raffinate and a first extract is generated and in a second stage SMB the first extract is separated in a second raffinate (desired product) and a second extract, all undesired constituents which should have been separated in the first stage (and should have ended in the first raffinate) will certainly end up in the second raffinate which in particular for low concentrations of the desired fraction makes such processes useless.

Apart from the above, also other modifier variations were applied to the SMB scheme, such as for a few years SMB processes are operated also in so-called "solvent gradient mode" (see e.g. U.S. Pat. No. 4,031,155). The meaning of this "solvent gradient" is that the SMB contains sections, which operate on different modifier levels. This type of gradient is a "step gradient". For the purification of biomolecules however a smooth linear gradient would be desired, as routinely applied in (linear) solvent gradient batch purifications.

An improvement using a combination of SMB and batch techniques and involving a recycling or "short-circuit" step is disclosed in WO 2006/116886. In this document a process for continuous or quasi-continuous purification of a multi-component mixture by means of individual chromatographic columns through which the mixture is fed by means of at least one solvent, is proposed. The multi-component mixture at least comprises weakly adsorbing impurities A, an intermediate product B to be purified and strongly adsorbing impurities C, and the columns are grouped into at least four sections ($\alpha$, $\beta$, $\gamma$, $\delta$), in which the first section $\alpha$ is provided with at least one inlet of solvent and at least one outlet for purified intermediate product B, such that it washes the purified intermediate product B out of the system, but keeps the strongly adsorbing impurities C inside the section $\alpha$, the second section $\beta$ is provided with at least one inlet of solvent and at least one outlet connected to an inlet of the fourth section $\delta$, such that it washes intermediate product B, which is contaminated with strongly adsorbing impurities C, into the fourth section δ through said outlet (short-circuiting), but keeps the pure strongly adsorbing impurities C inside the section β, the third section γ is provided with at least one inlet of solvent and an outlet for strongly adsorbing impurities C, such that it washes out the strongly adsorbing impurities C through said outlet and cleans the chromatographic column(s), the fourth section δ is provided with at least one inlet to receive output of the outlet of the second section β as well as at least one inlet for feeding in the multi-component mixture and at least one outlet for weakly adsorbing impurities A, such that it washes the weakly adsorbing impurities A out of the system, but keeps the intermediate product B inside the section δ. In this system after or within a switch time the last column from the first section is moved to the first position of the second section, the last column of the second section is moved to the first position of the third section, the last column of the third section is moved to the first position of the fourth section and the last column of the fourth section is moved to become the first column of the first section.

U.S. Pat. No. 5,093,004 (equivalent to EP 0 415 821) relates exclusively to simulated countercurrent operation of liquid and solid phase, in as it expressly states "In other words, the aim of the invention is to unite the simulated countercurrent gradient and the elution gradient techniques in one single continuously operating process, [ . . . ].". A core feature of the simulated countercurrent operation is that a subsequent column, seen in the flow direction of the liquid, receives input only from the preceding column and eventually from external solvent sources. This core feature is also emphasized in this prior art, e.g. in FIG. 2. All recycle streams external of the sections (e.g. connection 7 in FIG. 2) contain only pure solvent, as explained in detail in the description. EP 415 822 is essentially the same as U.S. Pat. No. 5,093,004, only with 5 zones, where zone 1 (reconditioning of the sorbent) from U.S. Pat. No. 5,093,004 is omitted.

SUMMARY OF THE INVENTION

The object of the present invention is to provide a further improvement in particular to the process according to WO 2006/116886. The invention specifically relates to two main aspects as concerns this improvement, namely on the one hand to a major amendment to the process which allows the separation of true multi-product mixtures, so which allows the separation into not only four fractions as according to WO 2006/116886 (as WO 2006/116886 actually allows to separate four fractions A, B, C and a fourth fraction with tracers), but which allows the separation into at least five fractions, in principle going up to the separation of any higher integer number of fractions. Therefore, more than four components (in case of essentially only one component in one fraction) can be obtained in a pure form. Note that the number of components is equal or larger than the number of fractions. On the other hand a major amendment to the process according to WO 2006/116886 is proposed which allows efficient washing of the columns prior to the introduction into the purification cycle and/or which allows the continuous inflow of feed even if the process is carried out in discontinuous mode, i.e. with two or more alternating flowsheets.

So the improvement relates to and starts off from a setup according to WO 2006/116886 in which for the separation of three fractions A, B, C there are several sections which are defined by their function in as follows:

Section α: wash the purified intermediate product out of the system, but keep the strongly adsorbing impurities C inside the section.

Section β: wash intermediate product B, which is contaminated with strongly adsorbing impurities into section δ, but keep the strongly adsorbing impurities inside the section.

Section γ: wash out the strongly adsorbing impurities and clean the chromatographic column(s) of the section.

Section δ: wash the weakly adsorbing impurities out of the system, but keep the desired product inside the section. Get the feed into the purification system.

In case of using 6 columns (see also FIG. 2) this means that one column (Section γ) has the function to get all the strongly adsorbing impurities C out of the column; one column (Section β) has the function to get all the intermediate product B out of this column but keep the strongly adsorbing impurities C in this column; one column (Section α) has the function to make sure no strongly adsorbing impurities C get out of this column but only the intermediate product B; one column (one of Section δ, $δ_g$) has the function to get all weakly adsorbing impurities A out of the column but keep the intermediate product B in the column; one column (a further one of Section δ, $δ_f$) has the function to get the feed Fd into the column and the first weakly adsorbing impurities A out of the column; and one column (one further of Section δ, $δ_r$) has the function to make sure no intermediate product B leaves the column and remove the tracers from the column.

Such a setup can also be split into 3 interconnected and 3 non connected columns, which is identical to such a 6 column setup. The lane with the 3 interconnected columns is called "CCL" (Counter Current-Lane) and the one with the non connected columns is called "BL" (Batch-Lane). The CCL consists of column positions 2, 4, 6 (β, $δ_g$, $δ_r$) and the BL consists of column positions 1, 3, 5 (γ, α, $δ_f$). When the 6 column system switches between the two states CCL and BL, all columns of the CC-Lane become columns of the "batch-lane" and all columns of the batch-lane become columns of the CC-lane. The local switch time of both lanes is equal to the overall switch time t*. That makes the overall process continuous. The batch columns and the countercurrent columns are operated in the same plant at the same time.

The invention presented here provides an improved separation process compared to the one as given above that allows for the separation of a mixture into four or more fractions in a continuous or discontinuous manner. The process comprises multiple columns grouped into sections that fulfil different tasks in a parallel and/or sequential manner. The sections can be fluidly connected and disconnected by valves in a particular manner.

The present invention in particular relates to a process for continuous or quasi-continuous purification of a multi-component mixture Fd by means of at least four individual chromatographic columns through which the mixture is fed by means of at least one solvent, wherein the multi-component mixture Fd is to be separated into an integer number n of fractions $F_i$, wherein n is at least 5.

The columns are grouped into at least six sections $α_1, \ldots, α_{n-3}, β_1, \ldots, β_{n-3}, γ, δ$, wherein each section comprises at least one column with the proviso that the function of several sections can also be fulfilled sequentially and can be realized by single columns. So the functions are either fulfilled concomitantly or sequentially, in which latter case a single column may take the function of one section in one step (e.g. CCL) and another function in a subsequent step (e.g. BL).

At least two collection sections $α_1, \ldots, α_{n-3}$ are provided each with at least one inlet of solvent and at least one outlet for intermediate fractions $F_2, \ldots, F_{n-2}$, such that they each wash the respective intermediate components out of the system, but keep the stronger adsorbing components inside the section $α_1, \ldots, α_{n-3}$.

At least two recycling sections $\beta_1, \ldots, \beta_{n-3}$ are provided each with at least one inlet of solvent and each with at least one outlet connected to an inlet of either the subsequent downstream recycling section or, in the absence of a subsequent downstream recycling section, into a feed section $\delta$, such that they each wash the respective intermediately adsorbing components, which are contaminated with stronger adsorbing components, into either the subsequent downstream recycling section or, in the absence of a subsequent downstream recycling section, into said feed section $\delta$ through said outlets, but each keeping the respective more strongly adsorbing components to be eluted via the fractions $F_1, \ldots, F_{n-3}$ inside the corresponding recycling sections $\beta_1, \ldots, \beta_{n-3}$.

A strongly adsorbing component collection section $\gamma$ is provided with at least one inlet of solvent and an outlet for the strongest adsorbing component(s) (fraction $F_1$), such that it washes out the fraction $F_1$ containing the strongest adsorbing component(s) through said outlet.

The feed section $\delta$ is provided with at least one inlet to receive output of the outlet of the most downstream recycling section $\beta_{n-3}$ as well as with at least one inlet for feeding in the multi-component mixture Fd and at least one outlet for at least the weakest adsorbing component(s) (fractions $F_{n-1}, F_n$), such that it washes the weakly adsorbing component(s) out of the system in the fractions $F_{n-1}, F_n$, but keeps the stronger adsorbing intermediately adsorbing component fractions $F_2, \ldots, F_{n-2}$ inside the section $\delta$.

Wherein the functions of the sections $\alpha_1, \ldots, \alpha_{n-3}$, $\beta_1, \ldots, \beta_{n-3}, \gamma, \delta$ can either be fulfilled synchronously or sequentially.

Columns are run in at least one batch mode position in which the outlets of at least two collection section columns $\alpha_1, \ldots, \alpha_{n-3}$ are used to collect intermediate fractions $F_2, \ldots, F_{n-3}$ as well as in at least one interconnected (continuous or quasi-continuous mode) position, in which the outlets of at least two recycling section columns $\beta_1, \ldots, \beta_{n-3}$ are fluidly connected with the corresponding inlets of subsequent downstream recycling sections or, in the absence of a subsequent downstream recycling section, into said feed section.

The batch mode and the continuous or quasi-continuous mode can either be realized synchronously or sequentially.

Within a switch time t* the columns are moved in their positions in a counter direction to the general direction of flow of the solvent.

After or within a switch time t* the first column (in a solvent flow direction) from each collection section $\alpha_1, \ldots, \alpha_{n-3}$ is moved to the last position (in a solvent flow direction) of the corresponding recycling section $\beta_1, \ldots, \beta_{n-3}$, the first column of the most upstream recycling section $\beta_1$ is moved to the last position of the strongly adsorbing component collection section $\gamma$ and the first columns of the further recycling sections $\beta_2, \ldots, \beta_{n-3}$ are moved to the last position of the next upstream collection section $\alpha_1, \ldots, \alpha_{n-4}$, the first column of the strongly adsorbing component collection section $\gamma$ is moved to the last position of the feed section $\delta$ and the first column of the feed section $\delta$ is moved to become the last column of the most downstream collection section $\alpha_{n-3}$.

If groupings of the sections (such as e.g. $\gamma, \beta_1; \alpha_1, \beta_2; \ldots$; $\alpha_{n-3}, \delta_g, \delta_f, \delta_r$) are realized by single columns, the functions or sub-functions of individual sections are fulfilled sequentially with alternating steps of continuous or quasi-continuous elution and steps with batch elution within one switch time t*. If there is no such groupings the functions are fulfilled concomitantly.

For the sake of clarity and for an unambiguous understanding of the terms used throughout this disclosure, the following definitions of terms shall be given:

Multicomponent mixture: designated as Fd (feed), is a mixture of m components K in a liquid carrier. The multicomponent mixture is introduced into the process as a feed and is to be separated into n fractions (wherein m is larger than or equal to n) in a purification process according to the invention.

Fraction: is a defined volume taken out at a defined step in the chromatographic process. A fraction in the ideal case may only comprise one single component, in practice however a fraction usually comprises more than one component. In case of essentially only one single component per fraction the multicomponent mixture of n components is separated into n fractions each essentially only comprising one single component. Fractions are numbered with the index n, and in the context of this document the fraction $F_1$ with the lowest index stands for the most strongly adsorbing component(s) comprising fraction, and the fraction $F_n$ with the highest index stands for the most weakly adsorbing component(s) comprising fraction, while fractions $F_2, \ldots, F_{n-1}$ stand for intermediately adsorbing fractions or intermediate component comprising fractions, which are the primary interest in the context of the proposed process.

Strongly adsorbing component: is a component present in the multicomponent mixture which shows high retention, so which interacts more firmly or strongly with the solid stationary phase of the chromatographic system and which therefore elutes in a late phase of a chromatographic process. Strongly adsorbing components are often also called heavy components in spite of the fact that retention is not generally linked to molecular weight, so a heavy component in this chromatographic context is not necessarily a component with high molecular weight.

Weakly adsorbing component: is a component present in the multicomponent mixture which shows low retention, so which interacts only lightly with the solid phase of the chromatographic system, and which therefore elutes in an early phase of a conventional chromatographic process. Weakly adsorbing components are often also called light components in spite of the fact that retention is not generally linked to molecular weight, so a light component in this chromatographic context is not necessarily a component with low molecular weight.

Section: is a part or rather a function of the chromatographic process (designated as $\alpha_1, \ldots, \alpha_{n-3}, \beta_1, \ldots, \beta_{n-3}, \gamma, \delta$). The function of a section can be taken over by one column or by several columns, which may be arranged sequentially or in parallel, where in case of sequential arrangement they are normally at least partially interconnected. As concerns the expression "columns" it is noted that instead of or in combination with columns, membrane adsorbers or other solid phases employing adsorptive principles may be used. As outlined, the function of a section can be taken over either during the whole time (synchronously), in which case there is at least one column for each section. A function of a section can however also be taken over sequentially, so steps (e.g. batch steps and continuous steps) may alternate in which columns alternatingly take the function of different sections. For example in the case of two different time spans (CCL and BL) with different functions of columns there may be half the number of columns as there is sections, as each column in the two steps fulfils a different function. If however there is more than two steps in which a column fulfils a different function even less columns are possible. If in the context of a section (or a sub-section)

mention is made of a "first" position of a column this, in case of a row of interconnected columns in one section, is meant to refer to the mobile phase flow, so the first column of a section is the most upstream column of a section and the last is the most downstream column.

Subsection: is a part or rather a subfunction of a section (e.g. sub-sections of $\delta$ designated as $\delta_g$; $\delta_f$, $\delta_r$). The function of a sub-section can be taken over by one column or by several columns, which may be arranged sequentially or in parallel, where in case of sequential arrangement they are normally interconnected. The function of a sub-section can be taken over either during the whole time (synchronously), in which case there is at least one column for each sub-section. A function of a sub-section can however also be taken over sequentially, so steps (e.g. batch steps and continuous steps) may alternate in which columns alternatingly take the function of different sub-sections.

Quasi-continuous elution: the term quasi-continuous elution shall refer to a step in which at least two of the columns are interconnected but in which there are also columns which are operated in batch mode. This as for example illustrated by the column designated with 5b in FIG. 8. So a quasi-continuous mode position is a position where the outlet of at least one section is fluidly connected with the inlet of at least one other section.

Mobile phase (often referred to as solvent, or liquid): As mobile phases (eluents), liquids, gases, or supercritical fluids, as well as mixtures thereof may be used. The eluent compositions in the columns can vary or be the same in two or more sections of the process and within the columns of the sections. In particular, gradients can be run.

Considering the above one notes that if a setup is chosen in which all the functions of the sections are at any time taken over by at least one column, one needs to have 6 columns ($2\times\alpha$, $2\times\beta$, $\gamma$, $\delta_g$, $\delta_f$, $\delta_r$). For this reference is made to FIG. 3 just taking one column and not three for the section delta. As mentioned, these functions can however also be fulfilled sequentially, and then the minimum number of columns is 4 ($\alpha\rightarrow\beta$; $\alpha\rightarrow\beta$; $\delta\rightarrow\delta$; $\gamma\rightarrow\delta$; where the arrow indicates which function is taken by the same column when changing from BL to CCL). For this reference is made to FIG. 12 just taking two and not 3 columns for the section delta.

Comparing this with the above-cited prior art U.S. Pat. No. 5,093,004, instead, one of the core features this application is the so-called short-circuiting, i.e. a stream leaving a column is not necessarily fed into the next section downstream, but the one after the next column, see for example FIG. 3. A detailed discussion about the difference between the conventional simulated countercurrent operation of liquid and solid phase and the "short-circuiting" operation can be found in WO 2006/116886.

Further difference between U.S. Pat. No. 5,093,004 and this application, just to name a few, are:

- this invention concerns the separation of the feed mixture into at least 5 fractions (c.f. claim 1), while U.S. Pat. No. 5,093,004 considers only separations into 3 fractions (claim 1).
- U.S. Pat. No. 5,093,004 does not contain any of the sections a (only solvent inlet and outlet for intermediate fractions leaving the system entirely), section $\delta_f$ (only feed inlet and outlet for a fraction leaving the system entirely), section $\gamma$ (only solvent inlet and outlet for latest eluting fraction leaving the system entirely) as claimed here.

The feed section $\delta$ with at least two sub-functions comprising at least two columns can, according to a first preferred embodiment, be provided with at least one inlet to receive output of the outlet of the most downstream recycling section ($\beta_{n-3}$ as well as with at least one or two inlets for feeding in the multi-component mixture Fd and at least two outlets for the weakest adsorbing component(s) (fractions $F_{n-1}$, $F_n$), such that it washes the weakly adsorbing component(s) out of the system in the fractions $F_{n-1}$, $F_n$, but keeps the stronger adsorbing intermediately adsorbing components for fractions $F_2, \ldots, F_{n-2}$ (as well as $F_1$) inside the section $\delta$. The functions and sub-functions of the sections (such as $\gamma$, $\beta$; $\alpha$, $\delta_g$; $\delta_{fa}$, $\delta_{fb}$; $\delta_{fc}$, $\delta_r$) are fulfilled sequentially, and said batch mode and said continuous or quasi-continuous mode can be realized sequentially. In the step of quasi-continuous elution the column(s) of the recycling section(s) in this case are fluidly connected to inlet of the first column $\delta_g$ of the feed section, and the outlet of the first column $\delta_g$ of the feed section is fluidly connected to the inlet of the last column $\delta_r$ of the feed section, while a second intermediate column $\delta_{fb}$ of the feed section is run in batch mode using its inlet for feeding in the multi-component mixture Fd, and in the step of batch elution the columns of the strongly adsorbing component collection $\gamma$, of the collection section(s) $\alpha$, and a first $\delta_{fa}$ and a third $\delta_{fc}$ column of the feed section are run in batch mode and at least the first $\delta_{fa}$ column of the feed section is run using its inlet for feeding in the multi-component mixture Fd. For each of these sections or sub-sections one or several columns can be used.

According to a further preferred embodiment, pairs of sequential functions of the sections are combined within one column, wherein within one switch time steps of continuous or quasi-continuous elution and steps with batch elution, fulfilling those functions in sequential manner, alternate, wherein the feed section comprises three sub-sections, and wherein in the full system only four columns (or stacks or rows of columns) are provided, these four columns being connected sequentially in a step (CCL) of continuous or quasi-continuous elution within a first fraction of one switch time, and being driven in a batch step (BL) for taking out individual fractions $F_1, \ldots, F_{n-1}$ of the multi-component mixture (Fd) within a second fraction of the switch time. This is e.g. a process as illustrated in FIG. 7 and discussed in more detail further below.

According to a further preferred embodiment, pairs of sequential functions of the sections are combined within one column, wherein within one switch time steps of continuous or quasi-continuous elution and steps with batch elution, fulfilling those functions in sequential manner, alternate, wherein the feed section comprises at least five sub-sections, and wherein in the full system only five columns (or stacks or rows of columns) are provided, four of them being connected sequentially in a the CCL step (of quasi-continuous elution) within a first fraction of one switch time, and being driven in a batch step (BL) for taking out individual fractions $F_1, \ldots, F_{n-1}$ of the multi-component mixture (Fd) within a second fraction of the switch time. This is for example a process as illustrated in FIG. 12 which allows continuous and essentially uninterrupted feeding due to the fact that in the feed section the fifth column, indicated with 5b, is run in batch mode during the CCL step (in that there is provided one column in the feed section which is run in batch mode during the quasi-continuous elution).

According to yet another preferred embodiment, the functions and sub-functions of the sections $\gamma$, $\beta_1$; $\alpha_1$, $\beta_2$; $\ldots$; $\alpha_{n-3}$, $\delta_g$; $\delta_f$, $\delta_r$ are fulfilled sequentially, and said batch mode and said continuous or quasi-continuous mode are realized sequentially, wherein in the step of continuous or quasi-continuous elution the columns of the recycling sections are either fluidly connected to the next downstream recycling sections or fluidly connected to input of the first column $\delta_g$ of the feed section, and the output of the first column $\delta_g$ of the feed section is fluidly connected to the input of the last column $\delta_r$ of the feed section, and in that in the step of batch elution the columns of the strongly adsorbing component collection $\gamma$, of the collection sections $\alpha$, and a column $\delta_f$ of the feed section are run in batch mode and the column $\delta_f$ of the feed section is run using its inlet for feeding in the multi-component mixture Fd, wherein preferably there are two collection sections and two recycling sections and the process is realized using four columns or there are three collection sections and three recycling sections and the process is realized using six columns.

Quite independently, the present invention furthermore relates to a process for continuous or quasi-continuous purification of a multi-component mixture Fd by means of at least four individual chromatographic columns through which the mixture is fed by means of at least one solvent (s), wherein the multi-component mixture Fd is to be separated into an integer number n of fractions $F_n$, wherein n is at least 6. It should be noted that this process allowing for continuous feeding and most efficient washing of the columns prior to the introduction into their purification process is, independent of the above-mentioned multicomponent purification process, and invention and is, taken alone, new and inventive in view of the state-of-the-art.

Specifically, in this process the columns are grouped into at least four sections $\alpha$, $\beta$, $\gamma$, $\delta$, in which at least one collection section $\alpha_1, \ldots, \alpha_{n-3}$ is provided each with at least one inlet of solvent and at least one outlet for intermediate fraction(s) $F_2, \ldots, F_{n-2}$, such that each washes the respective intermediate fractions) $F_2, \ldots, F_{n-2}$ out of the system, but keeps the stronger adsorbing components inside the section $\alpha_1, \ldots, \alpha_{n-3}$, at least one recycling section $\beta_1, \ldots, \beta_{n-3}$ is provided with at least one inlet of solvent (s) and with at least one outlet connected to an inlet of either a subsequent downstream recycling section or, in the absence of a subsequent downstream recycling section, into a feed section $\delta$, such that it washes the respective intermediately adsorbing components to be eluted in the intermediate fraction(s) $F_2, \ldots, F_{n-2}$, contaminated with stronger adsorbing components to be eluted via fraction(s) $F_1, \ldots, F_{n-3}$, into either the subsequent downstream recycling section or, in the absence of a subsequent downstream recycling section, into said feed section $\delta$ through said outlet, but keeping the respective (pure) stronger adsorbing components to be eluted in fraction(s) $F_1, \ldots, F_{n-3}$ inside the corresponding recycling section(s) $\beta_1, \ldots, \beta_{n-3}$, a strongly adsorbing component collection section ($\gamma$) is provided with at least one inlet of solvent (s) and an outlet for the strongest adsorbing components (fraction $F_1$), such that it washes out the strongest adsorbing components with fraction $F_1$ through said outlet, wherein the feed section $\delta$ comprising at least two columns is provided with at least one inlet to receive output of the outlet of the most downstream recycling section $\beta_{n-3}$ as well as with at least one or two inlets for feeding in the multi-component mixture Fd and at least two outlets for at least the two weakest adsorbing fractions $F_{n-1}$, $F_n$, such that it washes the weakly adsorbing components out of the system in the fractions $F_{n-1}$, $F_n$, but keeps the stronger adsorbing intermediately adsorbing components for fractions $F_2, \ldots, F_{n-2}$ (as well as $F_1$) inside the section $\delta$, wherein the functions and sub-functions of the sections $\gamma$, $\beta$; $\alpha$, $\delta_g$; $\delta_{fa}$, $\delta_{fb}$; $\delta_{fc}$, $\delta_r$ are fulfilled sequentially. Columns are run in at least one batch mode position in which the outlet of at least one collection section column $\alpha_1, \ldots, \alpha_{n-3}$ is used to collect intermediate fraction(s) $F_2, \ldots, F_{n-3}$ as well as in at least one continuous or quasi-continuous mode position, in which the outlet of at least one recycling section column $\beta_1, \ldots, \beta_{n-3}$ is fluidly connected with the corresponding inlet of a subsequent downstream recycling section or, in the absence of a subsequent downstream recycling section, into said feed section, wherein said batch mode and said continuous or quasi-continuous mode are realized sequentially.

After or within a switch time t* the columns are moved in their positions in a counter direction to the general direction of flow of the solvent.

After or within a switch time t* the first column from the collection section $\alpha_1, \ldots, \alpha_{n-3}$ is moved to the last position of the corresponding recycling section $\beta_1, \ldots, \beta_{n-3}$, the first column of the most upstream recycling section $\beta_1$ is moved to the first position of the strongly adsorbing component collection section $\gamma$ and, if present, the first column of the further recycling sections $\beta_2, \ldots, \beta_{n-3}$ are moved to the last position of the next upstream collection section $\alpha_1, \ldots, \alpha_{n-4}$, the first column of the strongly adsorbing component collection section $\gamma$ is moved to the last position of the feed section $\delta$ and the first column of the feed section $\delta$ is moved to become the last column of the most downstream collection section $\alpha_{n-3}$. Groupings of the sections $\gamma$, $\beta_1$; $\alpha_1$, $\beta_2$; $\ldots$; $\alpha_{n-3}$, $\delta_g$; $\delta_{fa}$, $\delta_{fb}$; $\delta_{fc}$, $\delta_r$ are realized by single columns, and the functions or sub-functions of individual sections are fulfilled sequentially with alternating steps of continuous or quasi-continuous elution and steps with batch elution within one switch time t*, in that in the step of continuous or quasi-continuous elution the column(s) of the recycling section(s) are fluidly connected to input of the first column $\delta_g$ of the feed section, and the output of the first column $\delta_g$ of the feed section is fluidly connected to the input of the last column $\delta_r$ of the feed section, while a second intermediate column $\delta_{fb}$ of the feed section is run in batch mode using its inlet for feeding in the multi-component mixture Fd, and in that in the step of batch elution the columns of the strongly adsorbing component collection $\gamma$, of the collection section(s) $\alpha$, and a first $\delta_{fa}$ and a third $\delta_{fc}$ column of the feed section are run in batch mode and at least one column of the feed sections $\delta_{fa}$, $\delta_{fb}$, $\delta_{fc}$ is run using its inlet for feeding in the multi-component mixture Fd.

In this context a process, in which only four columns are used is particularly advantageous. According to such a preferred embodiment of this aspect, the functions and sub-functions of the sections ($\gamma$, $\beta$; $\alpha$, $\delta_g$; $\delta_{fa}$; $\delta_{fb}$, $\delta_{fc}$, $\delta_r$) are fulfilled sequentially (see also FIG. 8), and said batch mode and said continuous or quasi-continuous mode are realized sequentially, wherein in the step of quasi-continuous elution the column of a single recycling section is fluidly connected to the input of the first column $\delta_g$ of the feed section, and the output of the first column $\delta_g$ of the feed section is fluidly connected to the input of the last column $\delta_r$ of the feed section, while at the same time the second intermediate column ($\delta^{fb}$) of the feed section is run in batch mode using its inlet for feeding in the multi-component mixture (Fd) and the output for collection of a fraction ($F_4$), and in the step of batch elution the columns of the strongly adsorbing component collection $\gamma$, of the collection section $\alpha$, and the first and the third intermediate columns ($\delta_{fa}$, $\delta_{fc}$) of the feed section are run in batch mode using at least one of their inlets for feeding in the multi-component mixture Fd. There can also be two recycling sections in this context which then leads to a total number of 5 columns.

The now following preferred embodiments relates to both of the above-mentioned processes, so to the multicomponent purification process as well as to the process allowing for continuous feeding.

According to a preferred embodiment, the solvent(s) fed into at least one of the sections is substantially continuously varied in composition during the switch time (t*), and/or, in case of a supercritical solvent, the supercritical solvent(s) fed into at least one of the sections is substantially continuously varied in density during the switch time (t*).

According to a further preferred embodiment, the solvent(s) fed into at least one or preferably all the sections is substantially continuously varied in composition with increasing or decreasing modifier concentration during the switch time (t*), and/or in case of supercritical solvent varied in density with increasing or decreasing density during the switch time (t*), and wherein along the sequence of the columns from the most downstream ($\delta$) to the most upstream ($\alpha$) section, the modifier concentration ($C_{mod}$)/density is increasing or decreasing in a way such that after a move of the columns, the modifier concentrations ($C_{mod}$)/densities in each column is substantially at the base concentration of modifier/density of the supercritical solvent at the new position of the column and such that during the following switch time (t*) the modifier concentration/density inside each column is increased or decreased to the base concentration/density of the following position after a further move of the columns.

At each solvent inlet solvent with individual constant base concentration ($C_{mod,c}$) of modifier can be provided, wherein a solvent stream with varying flow-rate and/or composition, preferably varying modifier concentration, ($C^{mod,v}$) is provided to several inlets and mixed with the solvent with individual constant base concentration ($C_{mod,c}$) of modifier to establish the gradient along the system.

The solvent(s) fed into all or some of the sections can be substantially continuously varied linearly or quasi-linearly or non-linearly during the switch time (t*) in composition and/or density, wherein preferably the modifier concentration is varied in such a manner.

The feed section can comprise at least three columns grouped into three sub-sections, or less columns sequentially providing the function of these sub-sections wherein the first sub-section $\delta_f$ comprises at least one inlet for feeding in the multi-component mixture, preferably at a flow rate lower than the overall flow rate in the system, and at least one outlet for a fraction $F_{n-1}$, wherein the second sub-section $\delta_g$ comprises at least one inlet for taking up output of the most downstream recycling section $\beta_{n-3}$ and at least one outlet connected to at least one inlet of the third sub-section $\delta_r$.

The third sub-section $\delta_r$ may comprise at least one inlet for taking up output of the second sub-section $\delta_g$ and at least one outlet for a fraction $F_n$.

After or within a switch time (t*) a first column from the first sub-section ($\delta_f$) is moved to the last position of the second sub-section ($\delta_g$), the first column of the second sub-section ($\delta_g$) is moved to the last position of the collection section, the first column of the strongly adsorbing component collection section ($\gamma$) is moved to the last position of the third sub-section ($\delta_r$) and the first column of the third sub-section ($\delta_r$) is moved to become a column of the first sub-section ($\delta_f$), and the functions of the sections can be either fulfilled synchronously or sequentially.

Pairs of sequential functions of the sections can be combined within one column, and wherein within one switch time steps of continuous or quasi-continuous elution and steps with batch elution, fulfilling those functions in sequential manner, alternate.

The feed section can comprise three sub-sections and in the full system four columns can be provided, these four columns being connected sequentially in a step (CCL) of continuous or quasi-continuous elution within a first fraction of one switch time, and being driven in a batch step (BL) for taking out individual fractions ($F_1$, $F_{n-1}$) of the multi-component mixture (Fd) within a second fraction of the switch time.

As all sections as outlined above, the first sub-section in this specific case can comprise at least two parallel columns, and/or the second and/or the third sub-section can comprise at least two countercurrent parallel or sequential columns.

The feed can be continuous, pulsed or with shaped concentration/density profile within one switch time (t*) and/or wherein the flows of solvents are varied within one switch time (t*) and/or wherein the switching of individual inlets/outlets is staged within one switch time (t*).

The flow rate in individual columns can be the same or different.

Furthermore the present invention relates to a device for carrying out any of the above defined processes. The specifics of this device are defined in the corresponding claims. Normally such devices comprise a topology of at least four, preferably at least five individual, chromatographic columns.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
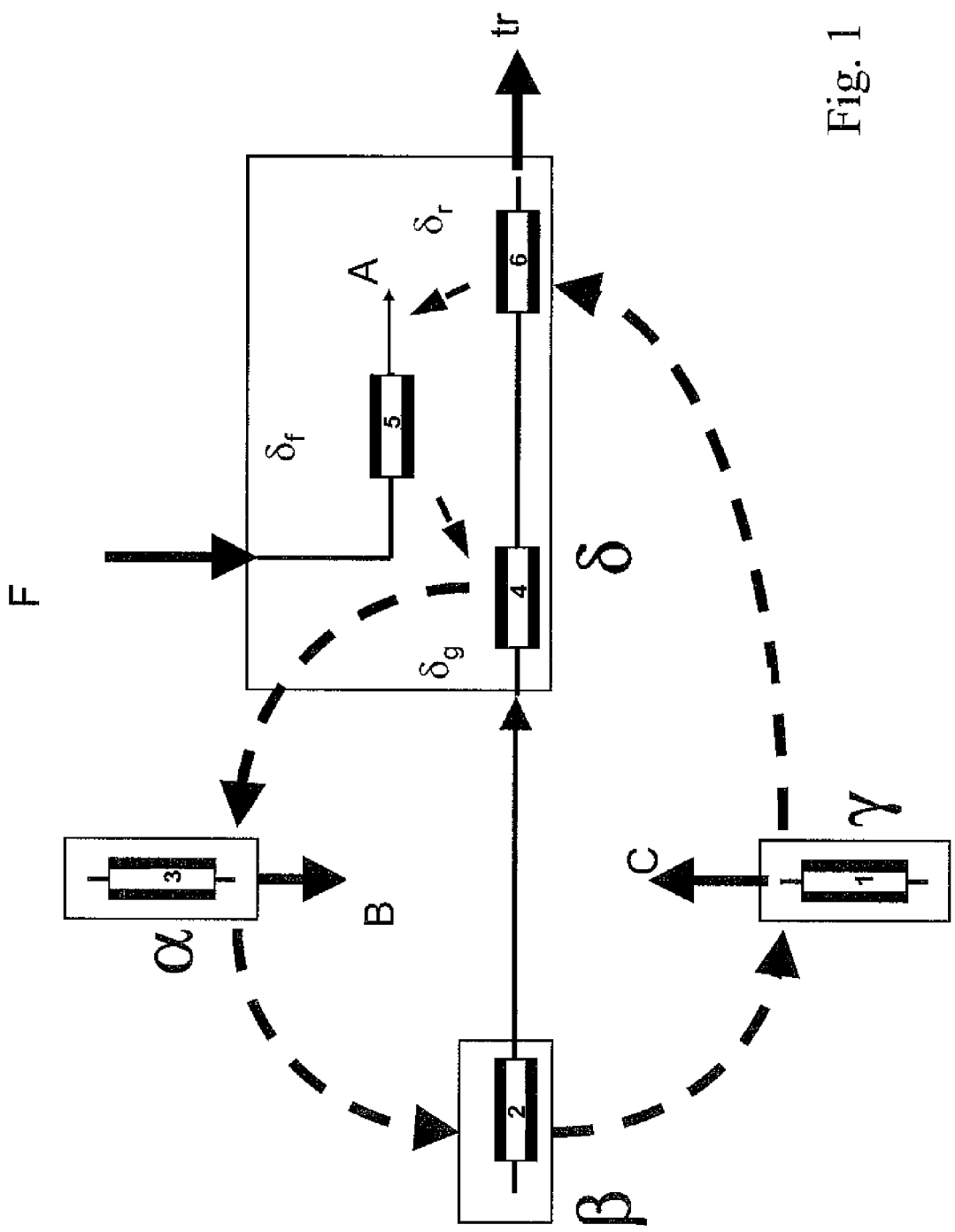
FIG. 1 shows a flow sheet of a continuous purification process using 6 columns.
Figure 2:
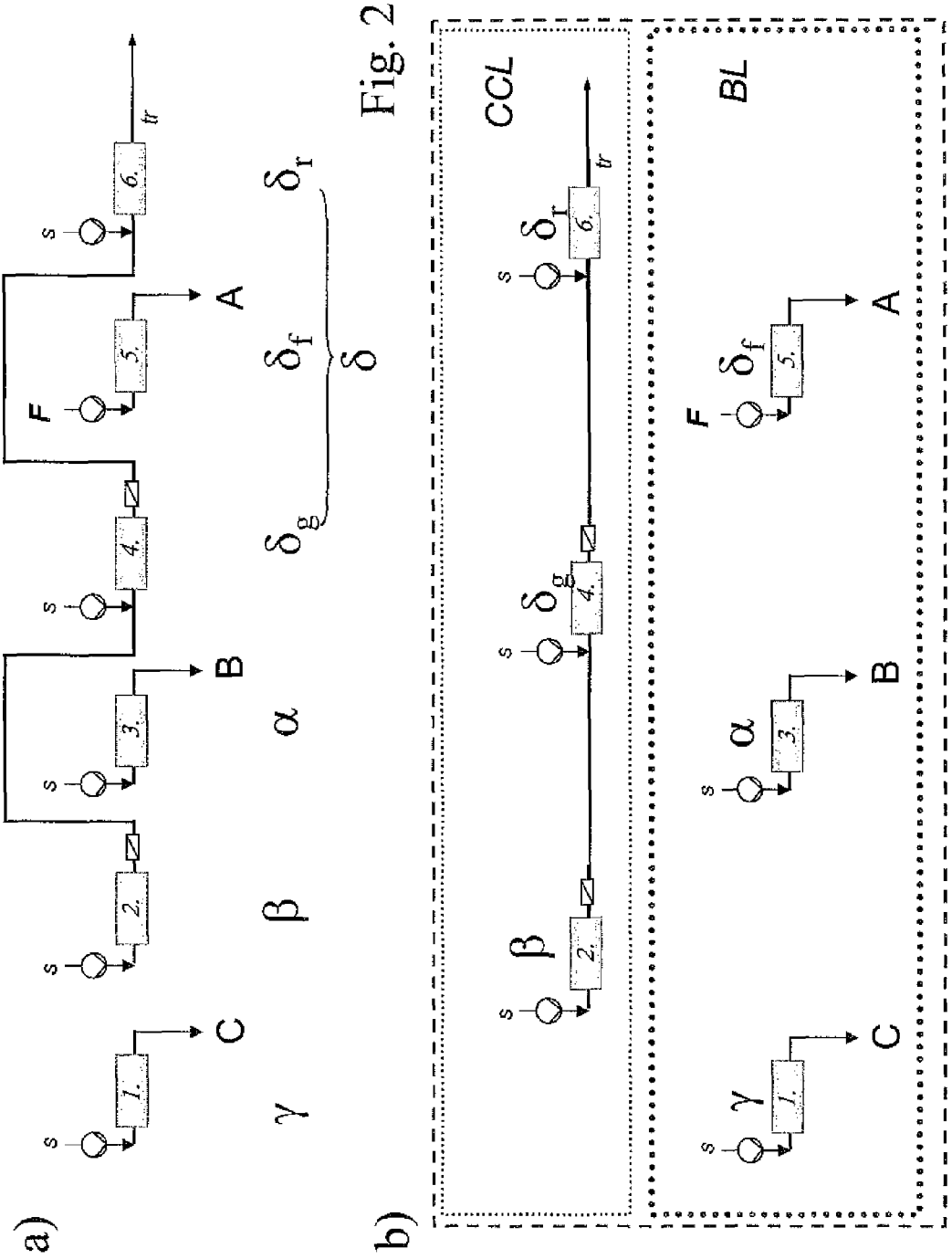
FIG. 2 shows a discontinuous 6-column unit with countercurrent-lane and batch-lane, wherein a) gives a sequential representation and b) a illustration showing the batch lane (BL) and the countercurrent lane (CCL) as individual steps.

In FIG. 2a) a 6-column setup according to the state-of-the-art, in particular as defined in WO 2006/116886 is shown and the sections embodied by each of the single columns are indicated in the figure. The general topography of the setup according to FIG. 2 is given in FIG. 1.

The sections have specific tasks, which are:

Section α: wash the purified intermediate product out of the system, but keep the strongly adsorbing impurities inside the section.

Section β: wash intermediate product, which is contaminated with strongly adsorbing impurities into section δ, but keep the strongly adsorbing impurities inside the section.

Section γ: wash out the strongly adsorbing impurities and clean the chromatographic column(s) of the section. Cleaning in place (CIP).

Section δ: wash the weakly adsorbing impurities out of the system, but keep the desired product inside the section. Get the feed into the purification system.

Specifically in case of FIG. 2, the following tasks are fulfilled by the columns with reference to the numbering:

1. get all the strongly adsorbing impurities C out of the column
2. get all the intermediate product B out of this column but keep the strongly adsorbing impurities C in this column
3. make sure no strongly adsorbing impurities C get out of this column but only the intermediate product B
4. get all weakly adsorbing impurities A out of the column but keep the intermediate product B in the column
5. get the feed Fd into the column and the first weakly adsorbing impurities A out of the column
6. make sure no intermediate product B leaves the column and remove the tracers from the column.

In FIG. 2 b), the 6 column setup is split into 3 interconnected and 3 non connected columns, which is identical to the 6 column setup drawn in FIG. 2a). The lane with the 3 interconnected columns is called "CCL" (Counter Current-Lane) and the one with the non connected columns is called "BL" (Batch-Lane).

The CCL consists of column positions 2,4,6 (β, $δ_g$, $δ_r$) and the Batch-Lane consists of column positions 1,3,5 (γ, α, $δ_f$). It is obvious, that, when the 6 column system switches between the two states CCL and BL, all columns of the CC-Lane become columns of the "batch-lane" and all columns of the batch-lane become columns of the CC-lane. The local switch time of both lanes is equal to the overall switch time t*. That makes the overall process continuous. The batch columns and the countercurrent columns are operated in the same plant at the same time.

The invention presented here provides an improved separation process compared to the one as displayed in FIGS. 1 and 2 that allows for the separation of a mixture into four or more fractions in a continuous or discontinuous manner. The process comprises multiple columns grouped into sections that fulfil different tasks in a parallel and/or sequential manner. The sections can be fluidly connected and disconnected by valves in a particular manner.

Figure 3:
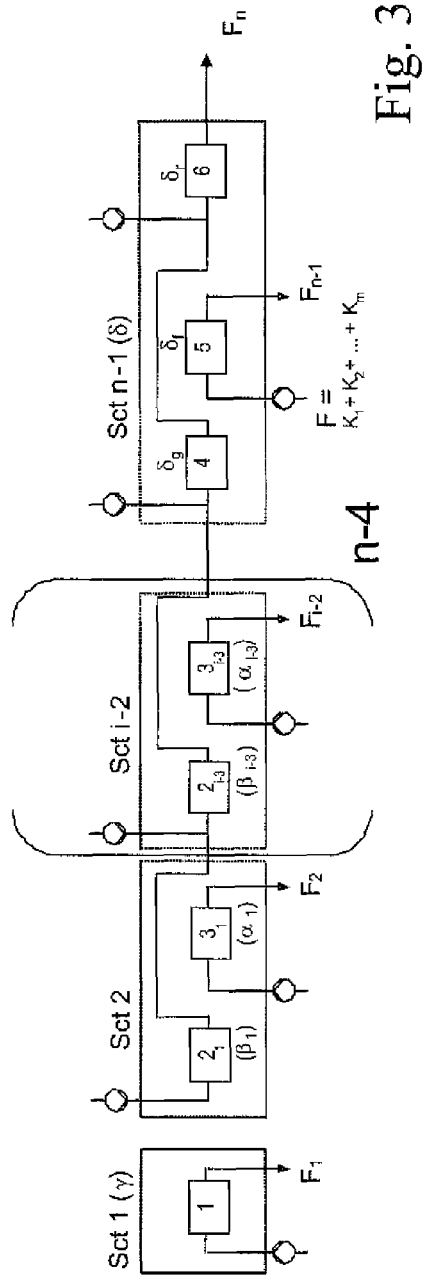
FIG. 3 shows a diagram of a continuous multifraction separation process.
Figure 4:
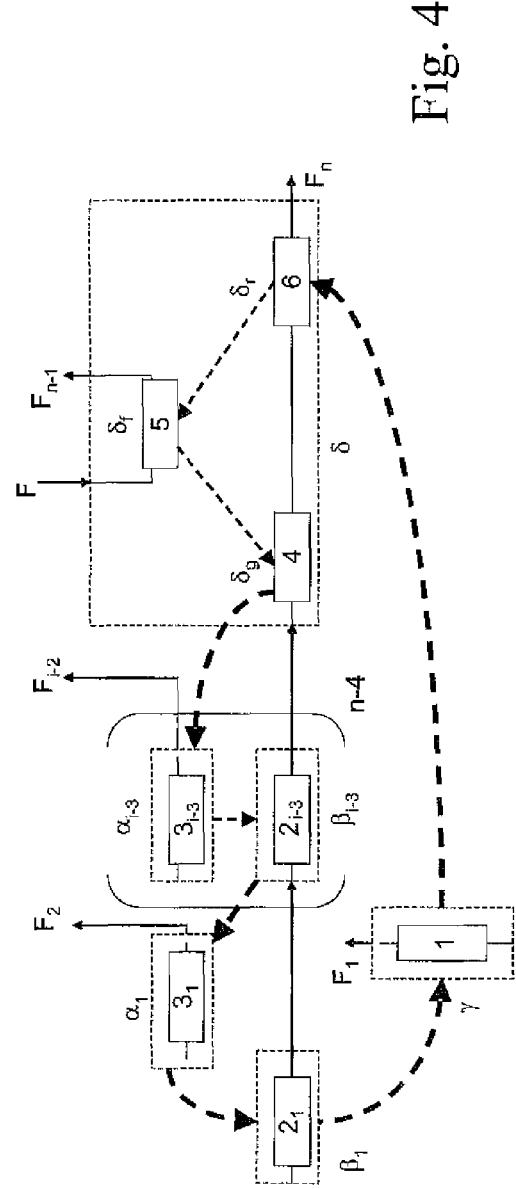
FIG. 4 shows a general flow sheet of a continuous multi-fraction separation process.

Generally it is noted that in case of FIGS. 3 and 4 n is an integer number and represents the number of fractions. n is larger or equal to 5. i is an index and starts at 5, increases with repetition of the unit given in brackets. m is the number of components K and is larger or equal to n. F stands for the fractions. In case of FIG. 5 n is chosen to be equal to 5, thus i is equal to 5, in case of FIG. 6 n is chosen to be equal to 6, and consequently i takes the values 5 and 6. In case of FIG. 10 n is chosen to be larger or equal to 6, the index i starts at 5, and the same holds true for FIG. 11. In case of FIG. 12 n is larger than or equal to 7, and the same holds true for FIG. 13.

The columns are grouped in sections γ, α, β and δ. The sections α, β represent a couple of intermediate sections of the process that may be repeated in order to enable the process to separate the feed mixture into more fractions. By repetition of the section couple (α, β) the section α is connected to section α of the subsequent repetition couple (α, β). Section α of the last repetition couple (α, β) is connected to section δ. The number of couples (α, β) in the process is given by the first couple (α, β) and at least one more repetition couple (α, β). Each couple (α, β) produces one fraction that may be sub-fractionated based on the elution order of the components from the section.

Section γ contains one fluid inlet and produces one fraction that may be sub-fractionated based on the elution order.

Section δ produces at least two fractions that may be sub-fractionated based on the elution order and contains at least one fluid inlet. In section δ a feed mixture is applied that consists of at least 4 different components that differ in retention behaviour. Section δ comprises at least one of the said feed mixture application column and two columns that are fluidly connected.

The purpose of the fluidly interconnected sections α and δ is the internal recycling of partially purified components for further purification and high yield of the components. After or within a given switch time period the columns of the process are switched in a direction opposite to the fluid flow which leads to a simulated countercurrent movement of stationary phase and mobile phase in the order δ, β, α, γ. In combination with the internal recycling, this leads to a high purity of the product fractions.

The purpose of sections γ and β is the elution of product and/or impurity fractions.

In the continuous embodiment of the process as shown in FIG. 3, the tasks of sections γ, α, β and δ are carried out in parallel and after or within a switch time period the columns progress in the order δ, β, α, γ, δ, and so on. The movement of the columns is illustrated in the flow-sheet showing this embodiment in FIG. 4. An example of this embodiment for a 5-fraction separation (n=5) with one repetition couple (α, β) is given in the flow sheet in FIG. 5. An example of this embodiment for a 6-fraction separation (n=6) with two repetition couples (α, β) is given in the flow sheet in FIG. 6.

Figure 7:
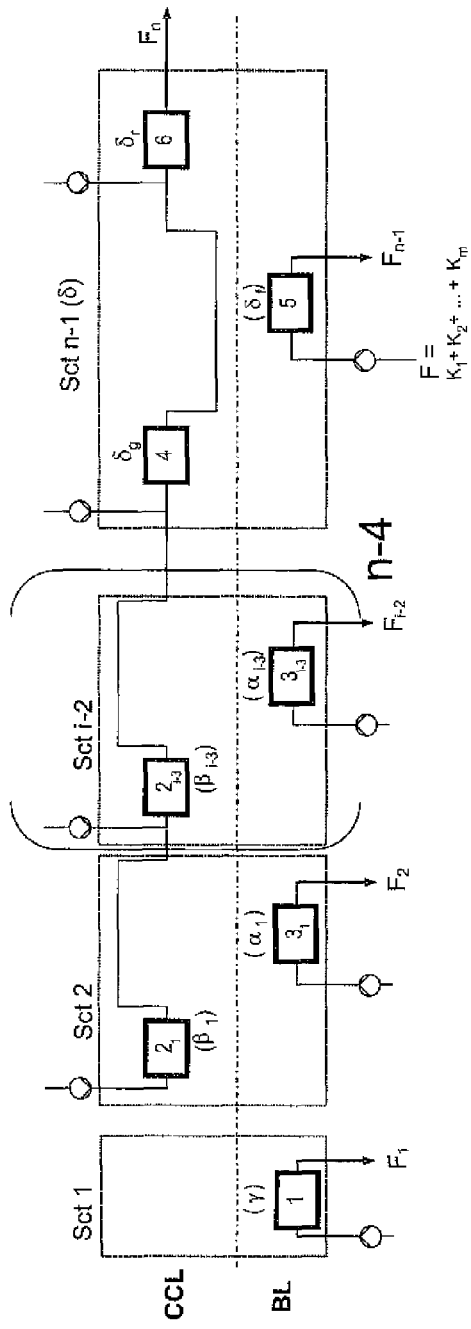
FIG. 7 shows a diagram of a discontinuous multifraction separation process with interconnected countercurrent lane (CCL) and batch lane (BL)

In the discontinuous embodiment of the process as shown in FIG. 7 the tasks of sections α and δ are carried out in parallel with the sections being fluidly disconnected. After or within a switch time period the columns of section α are switched in the direction of section γ and perform the tasks of section β of the previous repetition couple (α, β). The first column of section $β_1$ is switched to the position of the last column of section γ. At the same time the first column of section δ is switched to the position of the last column of section α of the last repetition couple (α, β). Within section δ, columns switch in the order of the subsections from 6 to 5, from 5 to 4.

The invention presented here also provides an improved purification process that allows for the separation of a mixture into four fractions in discontinuous manner whereby the feed containing the mixture is applied in a continuous manner. The process comprises 4 columns grouped into sections that fulfil different tasks in a parallel or sequential manner. The sections can be fluidly connected and disconnected by valves in a particular manner that is outlined in FIG. 8.

The columns are grouped in sections γ, α, β and δ.

Section γ contains one fluid inlet and produces one fraction that may be sub-fractionated based on the elution order.

Section δ produces at least two fractions that may be sub-fractionated based on the elution order and contains at least one fluid inlet. In section δ a feed mixture is applied that consists of at least 4 different components that differ in retention behaviour. Section δ comprises at least one of the said feed mixture application column and two columns that are fluidly connected.

The purpose of the fluidly interconnected sections α and δ is the internal recycling of partially purified components for further purification and high yield of the components.

After or within a given switch time period the columns of the process are switched in a direction opposite to the fluid flow which leads to a simulated countercurrent movement of stationary phase and mobile phase in the order δ, β, α, γ. In combination with the internal recycling, this leads to a high purity of the product fractions.

The purpose of sections γ and β is the elution of product and/or impurity fractions. The fractions derived from γ and β may be sub-fractionated based on the elution order of the components from the section.

Figure 8:
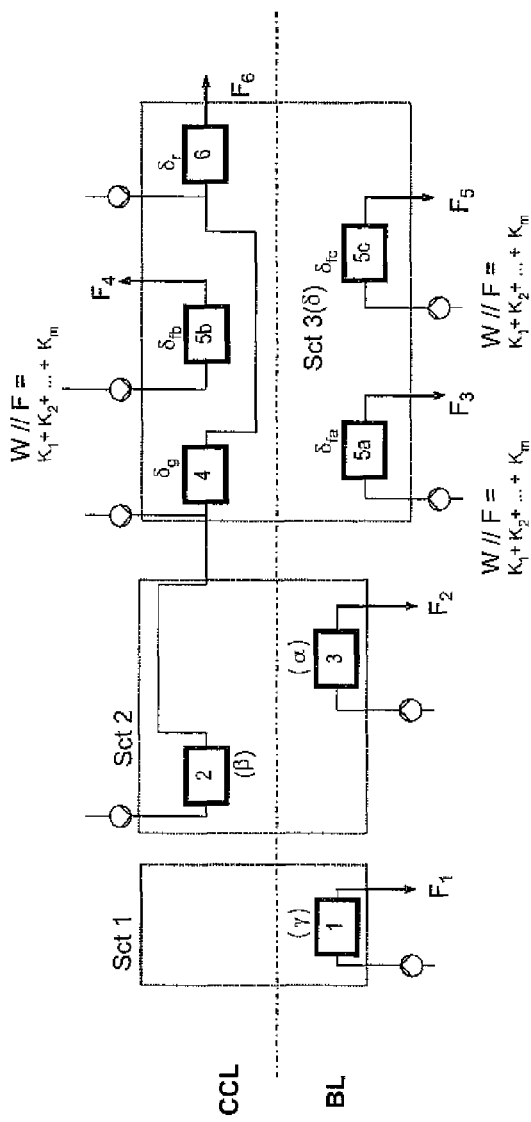
FIG. 8 shows a diagram of a discontinuous 4-column process with continuous feeding.
Figure 9:
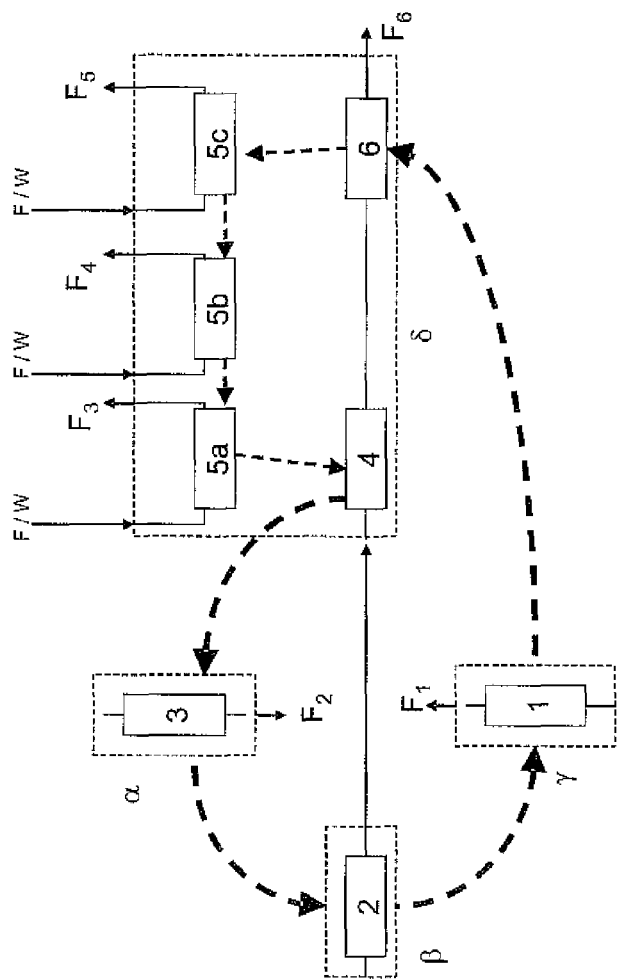
FIG. 9 shows a flow sheet of a continuous 4-column process with continuous feeding.

In the embodiment of the process as shown in FIG. 8, the tasks of sections γ, α, β and δ are carried out sequentially after or within a switch time period the columns progress in the order δ, β, α, γ, δ, and so on. The movement of the columns is illustrated in the flowsheet in FIG. 9.

Each of the sections α, γ, β is passed through by at least one column during one cycle δ, β, α, γ. Section δ contains at least 2 columns at each given point in time.

Instead of columns, membrane adsorbers or other solid phases employing adsorptive principles may be used.

As mobile phase, liquids or supercritical fluids may be used. The eluent compositions in the columns can vary or be the same in two or more sections of the process and within the columns of the sections. In particular, gradients can be run.

This concept can of course be combined with the multi-component separation process as defined above and vice versa.

Figure 10:
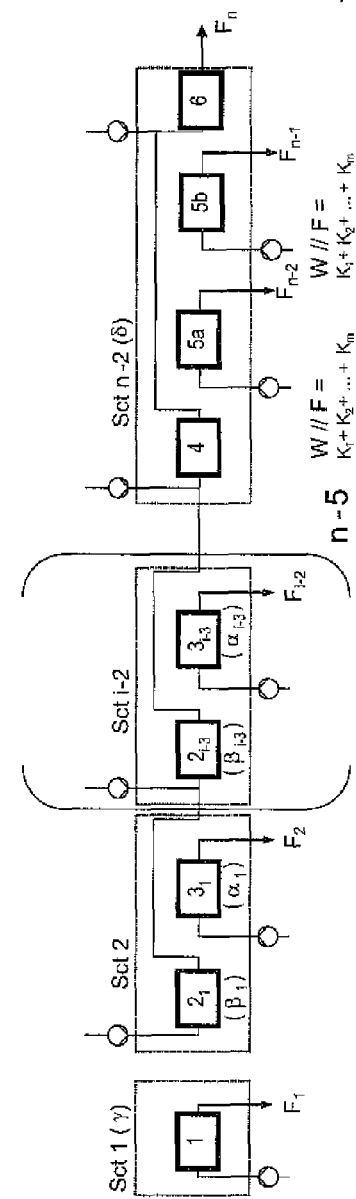
FIG. 10 shows a diagram of a continuous multifraction separation process with washing section/continuous feeding.
Figure 11:
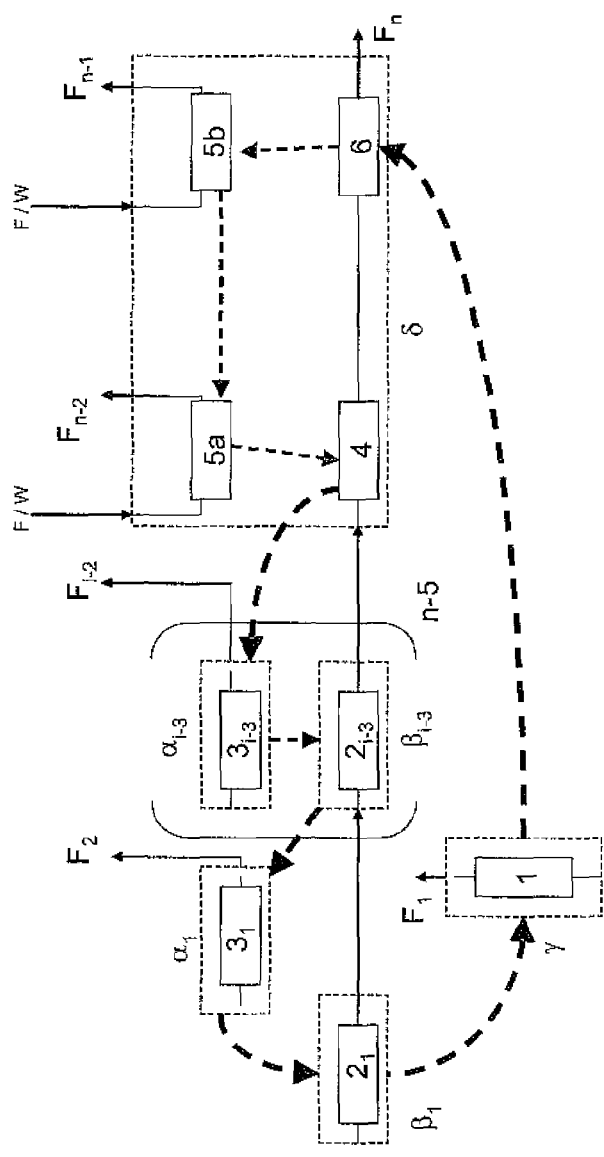
FIG. 11 shows a flow sheet of a continuous multifraction separation process with washing section/continuous feeding.

In the continuous embodiment shown in FIG. 10, the columns of the subsections of section δ switch in the order 6-5$b$-5$a$-4. This embodiment shows a process with a modified section δ in which a section 5$b$ has been added that contains at least one column for the purpose of washing or additional feeding. The first section for washing or feeding is denoted by 5$a$. The corresponding flow sheet is given in FIG. 11.

Figure 12:
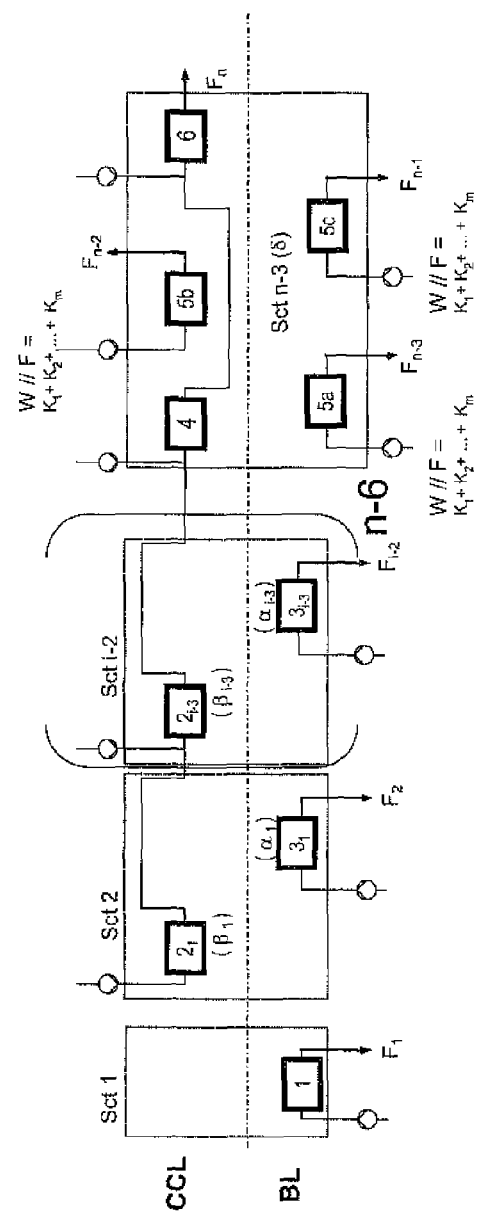
FIG. 12 shows a diagram of a discontinuous multifraction separation process with interconnected countercurrent lane (CCL and batch lane (BL) with washing section and continuous feeding.
Figure 13:
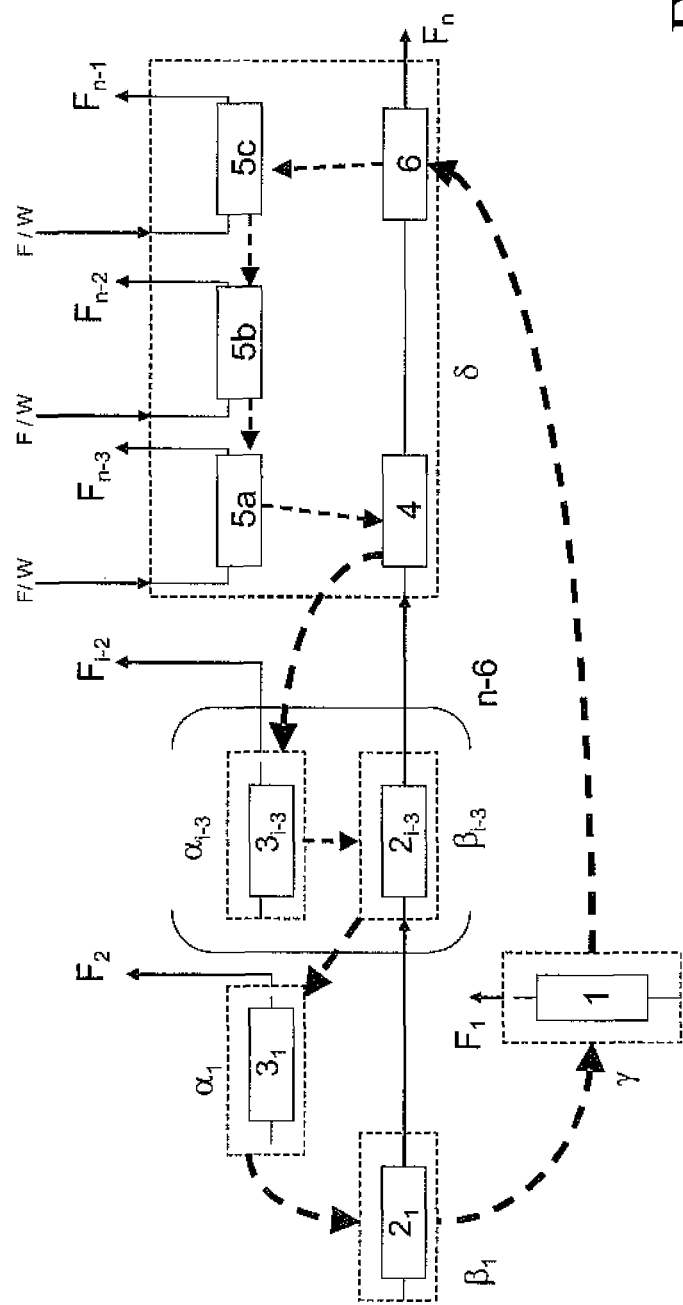
FIG. 13 shows a flow sheet of a discontinuous multifraction separation process with interconnected countercurrent lane (CCL) and batch lane (BL) with washing section and continuous feeding.

In the discontinuous embodiment shown in FIG. 12, the columns of the subsections of section δ switch in the order 6-5$c$-5$b$-5$a$-4. The three sections for washing or feeding are denoted by 5$a$, 5$b$, 5$c$.

Each of the sections α, γ, β contains at least one column. Section δ contains at least 2 columns in the case of the process shown in FIG. 3, FIG. 5, FIG. 6 and FIG. 7; 3 columns in the case of the processes shown in FIG. 12 and FIG. 13; 4 columns in the case of the processes shown in FIG. 10 and FIG. 11.

Instead of columns, membrane adsorbers or other solid phases employing adsorptive principles may be used.

As mobile phase, liquids or supercritical fluids may be used. The eluent compositions in the columns can vary or be the same in two or more sections of the process and within the columns of the sections. In particular, gradients can be run.

Figure 5:
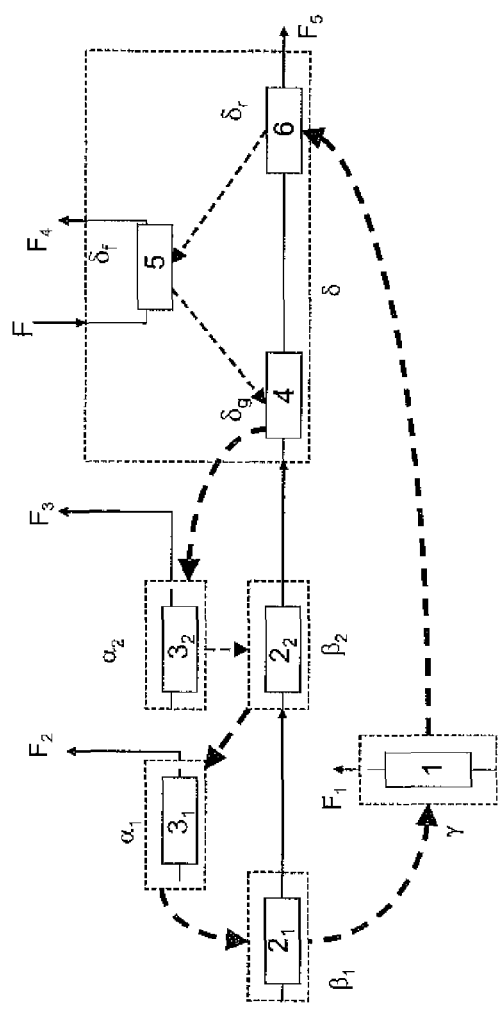
FIG. 5 shows a flow sheet of a continuous 5-fraction separation process.
Figure 6:
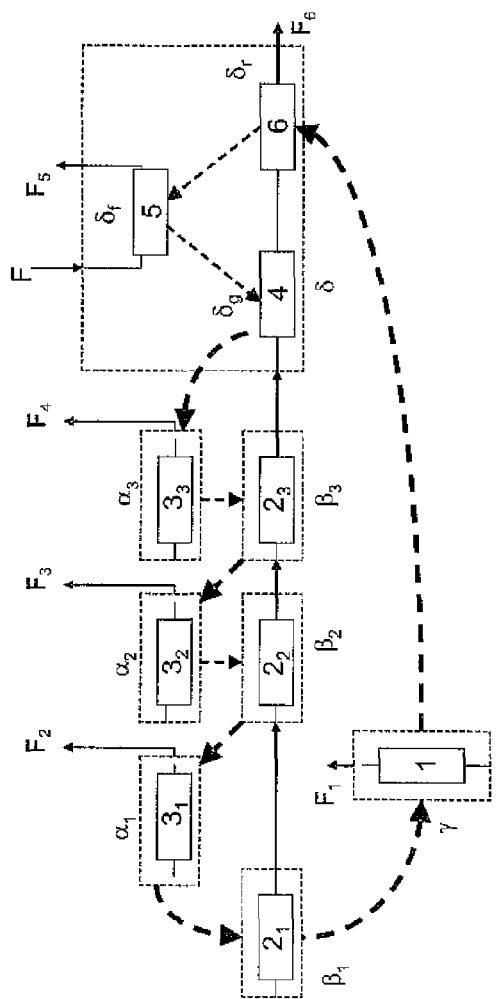
FIG. 6 shows a flow sheet of a continuous 6-fraction separation process.

In the following, an example for a separation into five fractions shall be presented using the flow-sheet as shown in FIG. 5.

The simulation is based on a lumped-kinetic model using a multi-component, competitive Langmuir isotherm. The Henry coefficients H are assumed to be a power function $H = a * c_M^b$ of the modifier (component 1) concentration $c_M$ and the parameters a and b as well as the isotherm saturation capacity are given in table T1.

TABLE T1

|  | Parameter a | Parameter b | Saturation capacity [g/L] |
| --- | --- | --- | --- |
| Component 2 | 0 | −3 | 50 |
| Component 3 | 2 | −3 | 50 |
| Component 4 | 5 | −3 | 50 |
| Component 5 | 10 | −3 | 50 |
| Component 6 | 40 | −3 | 50 |

Further simulation parameters are summarized in table T2.

TABLE T2

| Parameter name | Parameter value |
| --- | --- |
| Number of axial discretization points per column[−] | 50 |
| Mass transfer rate [1/min] | 100 |
| Column diameter [cm] | 0.8 |
| Column length [cm] | 10 |
| Column porosity [−] | 0.45 |
| Switch time [min] | 10 |
| Concentration of component2-component6 in feed stream to $\delta_f$ [g/L] | 0.02 |

The operating conditions of the flow-sheet configuration as shown in FIG. 3 are presented in table T3. It is worth noting that a linear gradient is operated by the respective feed pump between the start and the final modifier concentration during one switch. Components 2-6 are fed into the system only in section $\delta_f$.

TABLE T3

|  | Feed flow rate [mL/min] | Modifier concentration start [g/L] | Modifier concentration final [g/L] |
| --- | --- | --- | --- |
| Section 1 | 3 | 1 | 10 |
| Section 2, counter-current lane | 0.8 | 2.3 | 2.3 |
| Section 2, batch lane | 0.95 | 1 | 1 |
| Section 3, counter-current lane | 0.4 | 1 | 1 |
| Section 3, batch lane | 0.4 | 1 | 1 |
| Section 4, $\delta_g$ | 0.2 | 1 | 1 |
| Section 4, $\delta_f$ | 3 | 0.1 | 0.1 |
| Section 4, $\delta_r$ | 0.3 | 0.5 | 0.5 |

Figure 14:
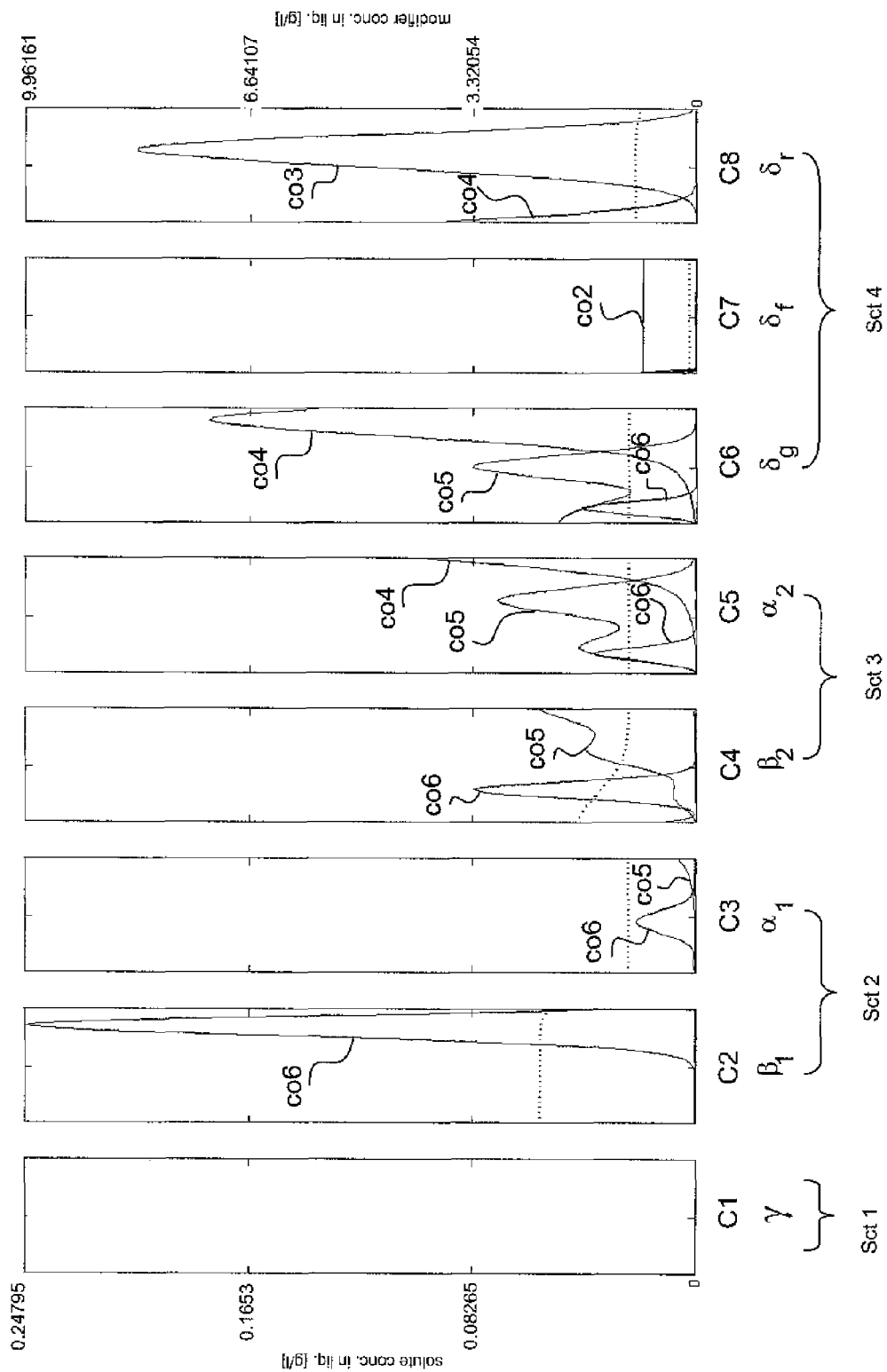
FIG. 14 shows the internal liquid phase concentration profiles of the components inside the columns at the end of the switch time and before the columns are switched.

It has to be noted that the operating conditions are not fully optimized in this example. In FIG. 14, the computed internal liquid phase concentration profiles of the components co1-co6 as defined in above tables inside the 6 columns c1-c6 are shown at the very end of the switch time and just before the columns are switched (switch number: 49, percent of switch: 100%). At this point, component 2 has almost completely left the system via section $\delta_r$. The designation of the columns and their correspondence with the nomenclature used in FIG. 3 are given and the sections 1-4 (sct1-sct4) are indicated as well. The obtained column outlet purities, being computed as the concentration of the respective component divided by the sum of all concentrations and averaged over one switch, are shown in table T4.

TABLE T4

|  | Purity [%] |
| --- | --- |
| Component 2 (co2) from section 4, $\delta_r$ | 99.4 |
| Component 3 (co3) from section 4, $\delta_f$ | 52.0 |
| Component 4 (co4) from section 3 | 99.9 |
| Component 5 (co5) from section 2 | 99.8 |
| Component 6 (co6) from section 1 | 100.0 |

It can be seen that for the example above, the component 3 (co3) is not obtained in particularly high purity, since it will be eluted together with the non-adsorbing component 2 (co2) from $\delta_r$. For higher feed concentrations, it would however be possible to reduce the feed flow rate, so that the non-adsorbing impurities do not elute from $\delta_f$ but only from $\delta_r$. In such a case, also Component 3 (co3) could be obtained with high purity.

LIST OF REFERENCE SIGNS

| | | | |
|---|---|---|---|
| BL | batch lane | | intermediately adsorbing components, normally desired product |
| CCL | countercurrent lane | | |
| α | collection section of the purification process | C | fraction containing strongly adsorbing components |
| β | recycling section of the purification process | s | solvent |
| γ | strongly adsorbing component collection section of the purification process | Fd | feed including all components as mixture |
| | | tr | tracers |
| δ | feed section of the purification process | Sct | Section |
| | | $F_i$ | fraction i |
| | | $K_i$ | component i in mixture of F |
| A, B, C | fractions | W | washing |
| A | fraction containing weakly adsorbing components | n | number of fractions |
| | | i | index |
| B | fraction containing | m | number of components in F |

The invention claimed is:

1. A process for continuous or quasi-continuous purification of a multi-component mixture by means of at least four individual chromatographic columns through which the mixture is fed by means of at least one solvent,
   wherein the multi-component mixture is to be separated into an integer number n of fractions, wherein n is at least 5,
   wherein the columns are grouped into at least six sections,
   wherein each section comprises at least one column with the proviso that the function of several sections can be fulfilled sequentially and can be realized by single columns,
   in which
   at least two collection sections are provided each with at least one inlet of solvent and at least one outlet for intermediately adsorbing components eluted in fractions,
      such that they each wash the respective intermediate fractions out of the system, but keep the stronger adsorbing components inside the respective section,
   at least two recycling sections are provided each with at least one inlet of solvent and each with at least one outlet connected to an inlet of either the subsequent downstream recycling section or, in the absence of a subsequent downstream recycling section, into a feed section,
      such that they each wash the respective intermediately adsorbing components, which are contaminated with stronger adsorbing components to be eluted via fractions into either the subsequent downstream recycling section or, in the absence of a subsequent downstream recycling section, into said feed section through said outlets, but each keeping the respective stronger adsorbing components to be eluted inside the corresponding recycling sections,
   a strongly adsorbing component(s) collection section is provided with at least one inlet of solvent and an outlet for the strongest adsorbing component(s) to be eluted in fraction,
      such that it washes out the fraction through said outlet,
   the feed section is provided with at least one inlet to receive output of the outlet of the most downstream recycling section as well as with at least one inlet for feeding in the multi-component mixture and at least one outlet for at least the two weakest adsorbing fractions,
      such that it washes the weakly adsorbing components out of the system in the fractions $F_{n-1}$, $F_n$, but keeps the stronger adsorbing intermediately adsorbing components fractions $F_1, \ldots, F_{n-2}$ inside the section,
   wherein the functions of the sections are either fulfilled synchronously or sequentially,
   wherein columns are run
   in at least one batch mode position in which the outlets of at least two collection section columns are used to collect intermediate fractions as well as in at least continuous or quasi-continuous mode position, in which the outlets of at least two recycling section columns are fluidly connected with the corresponding inlets of subsequent downstream recycling sections or, in the absence of a subsequent downstream recycling section, into said feed section,
   wherein said batch mode and said continuous or quasi-continuous mode are either realized synchronously or sequentially,
   wherein after or within a switch time the columns are moved in their positions in a counter direction to the general direction of flow of the solvent,
   and
   wherein after or within a switch time
      the first column from each collection section is moved to the last position of the corresponding recycling section,
      the first column of the most upstream recycling section is moved to the last position of the strongly adsorbing component collection section and
      the first columns of the further recycling sections are moved to the last position of the next upstream collection section,
      the first column of the strongly adsorbing component collection section is moved to the last position of the feed section and
      the first column of the feed section is moved to become the last column of the most downstream collection section,
   wherein if groupings of the sections are realized by single columns, the functions and/or sub-functions of individual sections are fulfilled sequentially with alternating steps of continuous or quasi-continuous elution and steps with batch elution within one switch time.

2. A process according to claim 1, wherein the feed section comprising at least two columns is provided with at least one inlet to receive output of the outlet of the most downstream recycling section as well as with at least two inlets for feeding in the multi-component mixture and at least two outlets for at least the two weakest adsorbing component fractions, such that it washes the weakly adsorbing components out of the system in the fractions but keeps the stronger adsorbing intermediately adsorbing components to be eluted via fractions inside the feed section,
   wherein the functions and sub-functions of the sections are fulfilled sequentially, and wherein said batch mode and said continuous or quasi-continuous mode are realized sequentially, and wherein in the step of quasi-continuous elution at least one column of a recycling section is fluidly connected to input of the first column of the feed section, and the output of the first column of the feed section is fluidly connected to the input of the last column of the feed section, while a second intermediate column of the feed section is run in batch mode using its inlet for feeding in the multi-component mixture, and wherein in the step of batch elution the columns of the strongly adsorbing component collection, of the collection section(s), and a first and a third column of the feed section are run in batch mode and at least one of the inlets of the feed sections is used for feeding the multi-component mixture.

3. A process according to claim 2, wherein pairs of sequential functions of the sections are combined within one column, wherein within one switch time steps of continuous or quasi-continuous elution and steps with batch elution, fulfilling those functions in sequential manner, alternate, wherein the feed section comprises three sub-sections, and wherein in the full system four columns are provided, these four columns being connected sequentially in a step of continuous or quasi-continuous elution within a first fraction of one switch time, and being driven in a batch step for taking out individual fractions of the multi-component mixture within a second fraction of the switch time.

4. A process according to claim 3, wherein only four columns are used and wherein functions and sub-functions of the sections are fulfilled sequentially, and said batch mode and said continuous or quasi-continuous mode are realized sequentially, wherein in the step of quasi-continuous elution the column of a single recycling section is fluidly connected to the input of the first column of the feed section, and the output of the first column of the feed section is fluidly connected to the input of the last column of the feed section, while at the same time the second intermediate column of the feed section is run in batch mode using its inlet for feeding in the multi-component mixture and the output for collection of a fraction, and in the step of batch elution the columns of the strongly adsorbing component collection, of the collection section, and the first and the third intermediate columns of the feed section are run in batch mode using at least one of their inlets for feeding in the multi-component mixture.

5. A process according to claim 1, wherein the functions and sub-functions of the sections are fulfilled sequentially, and wherein said batch mode and said continuous or quasi-continuous mode are realized sequentially, and wherein in the step of continuous or quasi-continuous elution the columns of the recycling sections are either fluidly connected to the next downstream recycling sections or fluidly connected to input of the first column of the feed section, and the output of the first column of the feed section is fluidly connected to the input of the last column of the feed section, and in that in the step of batch elution the columns of the strongly adsorbing component collection, of the collection sections, and a column of the feed section are run in batch mode and the column of the feed section is run using its inlet for feeding in the multi-component mixture.

6. A process according to claim 5, wherein there are two collection sections and two recycling sections and the process is realized using four columns or there are three collection sections and three recycling sections and the process is realized using six columns.

7. A process according claim 1, wherein the solvent(s) fed into at least one of the sections is substantially continuously varied in composition during the switch time, and/or, in case of a supercritical solvent, the supercritical solvent(s) fed into at least one of the sections is substantially continuously varied in density during the switch time.

8. A process according to claim 1, wherein the solvent(s) fed into at least one or all the sections is substantially continuously varied in composition with increasing or decreasing modifier concentration during the switch time, and/or in case of supercritical solvent varied in density with increasing or decreasing density during the switch time, and wherein along the sequence of the columns from the most downstream to the most upstream collection section, the modifier concentration ($C_{mod}$)/density is increasing or decreasing in a way such that after a move of the columns, the modifier concentrations ($C_{mod}$)/densities in each column is substantially at the base concentration of modifier/density of the supercritical solvent at the new position of the column and such that during the following switch time the modifier concentration/density inside each column is increased or decreased to the base concentration/density of the following position after a further move of the columns.

9. A process according to claim 1, wherein the feed section comprises at least three columns grouped into three sub-sections, or less columns sequentially providing the function of these sub-sections wherein the first sub-section comprises at least one inlet for feeding in the multi-component mixture, and at least one outlet for a fraction, wherein the second sub-section comprises at least one inlet for taking up output of the most downstream recycling section and at least one outlet connected to at least one input of the third sub-section, wherein the third sub-section comprises at least one inlet for taking up output of the second sub-section and at least one outlet for a fraction, wherein after or within a switch time a first column from the first sub-section is moved to the last position of the second sub-section, the first column of the second sub-section is moved to the last position of the collection section, the first column of the strongly adsorbing component collection section is moved to the last position of the third sub-section and the first column of the third sub-section is moved to become a column of the first sub-section, and wherein the functions of the sections are either fulfilled synchronously or sequentially.

10. A process according to claim 1, wherein pairs of sequential functions of the sections are combined within one column, and wherein within one switch time steps of continuous or quasi-continuous elution and steps with batch elution, fulfilling those functions in sequential manner, alternate.

11. A process according to claim 10, wherein the feed section comprises three sub-sections according to claim 8, and wherein in the full system four columns are provided, these four columns being connected sequentially in a step of continuous or quasi-continuous elution within a first fraction of one switch time, and being driven in a batch step for taking out individual fractions of the multi-component mixture within a second fraction of the switch time.

12. A process according to claim 1, wherein the feed is continuous, pulsed or with shaped concentration/density profile within one switch time and/or wherein the flows of solvents are varied within one switch time and/or wherein the switching of individual inlets/outlets is staged within one switch time.

13. A process according to claim 1, wherein the flow rate in individual columns is different.

14. A process according to claim 1, wherein the feed section comprises at least three columns grouped into three sub-sections, or less columns sequentially providing the function of these sub-sections wherein
- the first sub-section comprises at least one inlet for feeding in the multi-component mixture, at a flow rate lower than the overall flow rate in the system, and at least one outlet for a fraction, wherein
- the second sub-section comprises at least one inlet for taking up output of the most downstream recycling section and at least one outlet connected to at least one input of the third sub-section, wherein
- the third sub-section comprises at least one inlet for taking up output of the second sub-section and at least one outlet for a fraction,
- wherein after or within a switch time a first column from the first sub-section is moved to the last position of the second sub-section, the first column of the second sub-section is moved to the last position of the collection section, the first column of the strongly adsorbing component collection section is moved to the last position of the third sub-section and the first column of the third sub-section is moved to become a column of the first sub-section,
- and wherein the functions of the sections are either fulfilled synchronously or sequentially.

* * * * *